(12) United States Patent
Mercat

(10) Patent No.: US 7,909,411 B2
(45) Date of Patent: Mar. 22, 2011

(54) CYCLE RIM USING A SLEEVE CONNECTION AND A METHOD OF MANUFACTURING SUCH RIM

(75) Inventor: Jean-Pierre Mercat, Chavanod (FR)

(73) Assignee: Salomon S.A.S., Metz-Tessy (FR)

( * ) Notice: Subject to any disclaimer, the term of this patent is extended or adjusted under 35 U.S.C. 154(b) by 121 days.

(21) Appl. No.: 12/249,426

(22) Filed: Oct. 10, 2008

(65) Prior Publication Data
US 2009/0096277 A1  Apr. 16, 2009

(30) Foreign Application Priority Data

Oct. 12, 2007  (FR) ..................................... 07 07169

(51) Int. Cl.
*B60B 21/02* (2006.01)
(52) U.S. Cl. ......... 301/33; 301/30; 301/95.104; 301/99; 29/894.35; 403/297
(58) Field of Classification Search ............... 301/30–34, 301/95.104, 95.105, 95.106; 29/894.33, 29/894.35, 894.351; 403/297
See application file for complete search history.

(56) References Cited

U.S. PATENT DOCUMENTS

| 477,740 | A | * | 6/1892 | Derr et al. ........................ 301/99 |
| 832,888 | A | * | 10/1906 | Wittum ............................ 301/69 |
| 4,671,478 | A | * | 6/1987 | Schoenig et al. ........... 248/124.1 |
| 4,783,188 | A | * | 11/1988 | Souza, Jr. ....................... 403/190 |
| 4,938,540 | A | | 7/1990 | Sacks |
| 5,653,510 | A | | 8/1997 | Osborne |
| 5,734,142 | A | | 3/1998 | Kazmierczak |
| 6,216,413 | B1 | * | 4/2001 | Lapointe ......................... 52/849 |
| 6,641,227 | B2 | | 11/2003 | LaCombe et al. |
| 6,874,971 | B2 | * | 4/2005 | Albaugh ....................... 403/297 |
| 7,300,059 | B2 | * | 11/2007 | Caruso .......................... 273/400 |
| 2007/0046097 | A1 | | 3/2007 | Mercat et al. |

FOREIGN PATENT DOCUMENTS

| FR | 2 733 459 A1 | 10/1996 |
| JP | 01-262201 A | 10/1989 |
| WO | WO-96/33876 A1 | 10/1996 |
| WO | WO-98/03296 A1 | 1/1998 |
| WO | WO-02/40295 A1 | 5/2002 |

* cited by examiner

*Primary Examiner* — Russell D Stormer
(74) *Attorney, Agent, or Firm* — Greenblum & Bernstein, P.L.C.

(57) ABSTRACT

The invention is directed to a rim such as a rim for a cycle. The rim includes a circularly extending hollow box-shaped element, in the form of a radial profile of revolution about a transverse axis, with two end surfaces of such element being joined end-to-end at a junction and affixed via a sleeve that is positioned within the hollow box-shaped element, on each side of the junction. The sleeve includes a pair of bearing portions, which exert an internal force inside and against the walls of the hollow box-shaped element, such force being generated by a relative spacing apart of the bearing portions via a spreading device, such as at least one spacing member. The spacing member can be a wedging member or a screw, configured and arranged in association with the bearing portions so as to direct the bearing forces along an essentially transverse direction toward the side walls of the rim. The invention is also directed to a wheel having such a rim, as well as to a method of manufacturing such rim and wheel.

42 Claims, 6 Drawing Sheets

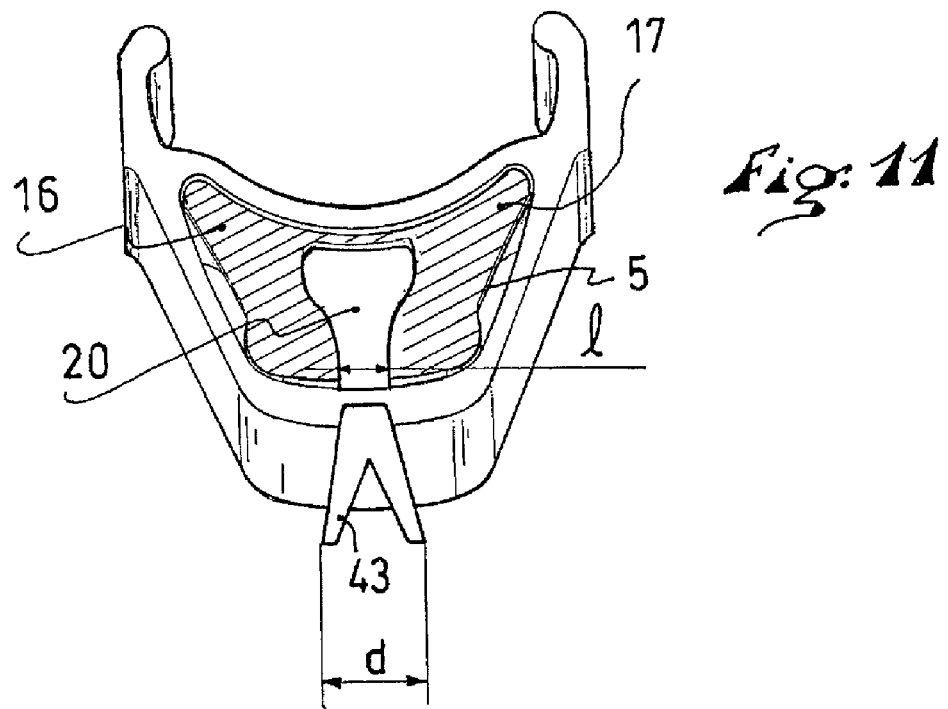
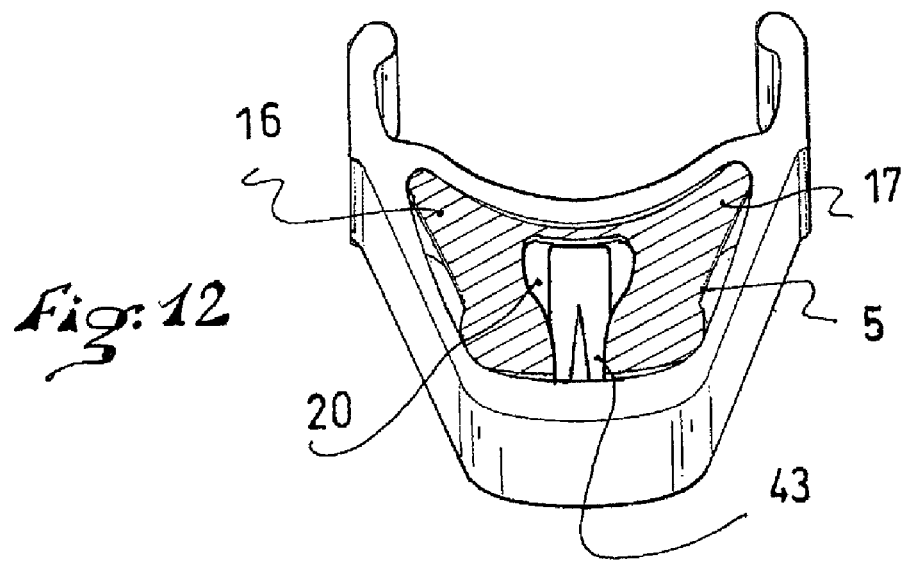

CYCLE RIM USING A SLEEVE CONNECTION AND A METHOD OF MANUFACTURING SUCH RIM

CROSS-REFERENCE TO RELATED APPLICATION

This application claims priority under 35 U.S.C. §119 of French Patent Application No. 07 07169, filed on Oct. 12, 2007, the disclosure of which is hereby incorporated by reference thereto in its entirety.

BACKGROUND OF THE INVENTION

1. Field of the Invention

The invention relates to the manufacture and assembly of rims for cycles and, more particularly, to a rim using a sleeve connection and a method for manufacturing such rim. The invention further includes a wheel having such rim and a method of manufacturing such wheel.

2. Description of Background and Other Information

Rims, in particular cycle rims, such as bicycle rims, are manufactured from a shaped element made of aluminum or aluminum alloy that is bent to form the rim. In most cases, a cycle rim is connected to the hub by sets of spokes to form the cycle wheel. The shaped element used for a rim can be any of various types, but it is typically U-shaped, including a pair of upstanding lateral flanges, and side walls which sometimes include, or provide, braking surfaces against which brake pads apply braking pressure.

Currently available rims are conventionally manufactured, as known to those skilled in the art, from a shaped element having a predetermined length, which is bent, the two ends of which are joined and fixed together. The rigidity of the hoop thus made is naturally dependent upon the quality of the material used to make the initial shaped element, and particularly upon its strength, which results from a so-called drawing process, or from the extrusion of aluminum, e.g., through a die having the dimensions and the form of the shaped element to be made.

One of the particular problems in the construction of rims is the connection of the ends after the bending operation. There are different methods of connecting the ends of the shaped element, none of which is entirely satisfactory.

A widely known method involves butt-joining the two ends of the bent shaped element, and then flash welding them in the area of the junction line between the two ends. A welding seam results from this method, which must then be milled and brushed. These operations are difficult to carry out on rim profiles that are quite complex. For the machining, a milling cutter must move around the profile by following the welding seam. Generally, a different milling cutter is used to eliminate the bulges on the inner surfaces of the lateral flanges and at the rim bottom, on which the tire is to be mounted. These operations require the use of specific devices particularly adapted therefor. Such a method is therefore expensive and is in fact used by certain manufacturers to make "top of the line" rims only. Moreover, the mechanical characteristics of the rim can be affected due to the welding operation, which causes metal annealing in the welded area by locally reducing the strength therein.

Another method involves coupling the two ends using two pins that are laterally spaced apart, and which penetrate into lateral channels provided in the rim shaped element. To obtain good strength for the junction, the adjustment must be tight and the dimensional tolerances must be completely controlled. Moreover, the rim shaped elements obtained are heavier due to the material surplus for each channel made. In addition, this method raises problems related to drawing the rim shaped element, which is complex to carry out. The drawing speeds are therefore quite low to obtain the necessary geometric and dimensional precisions. It is also necessary to provide a pairing of the connection pins in order not to damage the channels and to control the tightening forces properly.

Another method involves a sleeve coupling of a hollow tube that is prestressed within the cross section of the rim profile. The shape of the tube substantially complements that of the inner cross section of the shaped element. It is obtained by drawing a usually aluminum-base light alloy. With this technique, it is difficult to properly control tolerances below 0.3 mm. The rim profile is made by drawing or by extrusion, and the tolerance control is therefore approximately the same. Thus, it is difficult to always achieve a good tightening of the sleeve in the rim, in view of the dispersion of the dimensional tolerances of the rim and of the sleeve. Another drawback is that the length of the tube is often greater than the length separating two successive openings provided in the rim for attaching the spokes. It is therefore necessary to drill bores in the tube, in the area of these openings. This operation is difficult to carry out for extremely profiled rims intended for use in competition. It is also quite expensive. Moreover, it is necessary to use longer eyelets in the sleeve opening locations to hold the spokes; which implies having to manage a greater number of part references in the manufacture of the rim, and therefore to incur additional cost.

U.S. Pat. No. 4,938,540-A relates to a rim and the manufacturing method thereof, which uses a pin connection. An adhesive is used inside the channels in which the pins are inserted to overcome a sealing problem.

French Patent Publication No. 2 733 459-A1 proposes to overcome the drawbacks of the prior art by providing the connection for a rim by means of a sleeve made of two expansible portions and by means of a screw. The screw causes a relative spacing apart of the portions. However, one of the drawbacks with this solution relates to the deformation of the rim profile. Indeed, the force applied radially to eliminate backlash, i.e., to compensate for play between the sleeve and the rim, can cause a local deformation of the transverse bridge and/or of the lower base wall of the rim, which is generally tapered. This deformation can affect the control of the tightening force as well as the mechanical strength characteristics of the rim. The sleeve is also made of two elements which are adapted to be spaced apart by means of a screw, which makes the rim more expensive to manufacture and not easy to assemble and tighten. Finally, the arrangement of the screw does not allow fitting a sleeve on a rim having a flattened or low profile because the two portions of the sleeve do not have sufficient rigidity and strength, and the sleeve is also weakened by the central space.

SUMMARY OF THE INVENTION

The invention provides an improved solution that overcomes the principal problems of the prior art.

To this end, the invention relates to a cycle rim including a shaped element of revolution about a transverse axis, having the shape of a hollow box, or casing, in radial cross section, with two end surfaces butt-joined along a junction, and affixed via a sleeve inserted in the hollow box of the shaped element, on both sides of the junction, the sleeve including at least two sleeve bearing portions, which exert bearing forces inside and against the walls of the hollow box, such bearing forces being generated by a relative spacing apart of the portions by means of a spreading device, such as at least one spacing member or wedge.

According to a first inventive aspect, the spacing member is configured in association with the bearing portions so as to direct the bearing forces along an essentially lateral direction toward the side walls of the rim. Thus, the forces exerted by the sleeve are directed so as to generate the least possible deformation of the rim. In particular, the rim side walls or flanks withstand the deformation forces better because they are generally shorter, more rigid, and reinforced by at least one transverse bridge. It is even advantageous to have a sleeve with bearing portions that exert a more substantial force against them lower portion of the side walls at the junction of the side edges of the rim, rather than against the upper portion of the side walls at the junction of the upper bridge of the rim. "Lower portion," in this context, means the portion that is the farthest from the bottom of the rim, as opposed to the "upper portion", which is the portion closest to the bottom of the rim. When the bearing forces are exerted on the lower portion of the side walls of the rim, the edges for fastening the tire on the rim are less likely to be spaced apart. In particular, the lower portion can be thicker than the other walls of the rim in order to provide the spokes attached to that wall with resistance to tear.

According to one aspect of the invention, the spacing member provides an irreversible engagement in at least one space between the two bearing portions. "Irreversible engagement" means an engagement that is stable without spontaneous disengagement in the space between the two bearing portions. According to one principle of the invention, the engagement can be made irreversible by various types of spacing members.

In one possible embodiment, the engagement is made irreversible by the spacing member in the form of a wedge forcibly inserted between the two bearing portions. Such a wedge is configured so as to create friction forces that are enough to oppose the disengagement of the wedge in the space between the two bearing portions. The wedge includes engagement surfaces that form a non-zero angle therebetween, which provide irreversibility by friction of the contact connection with the contact surfaces of the bearing portions.

In another possible embodiment, the engagement is made irreversible by means of at least one spacing screw.

In another embodiment, the engagement can be made irreversible by welding an element between and on the surfaces of the two bearing portions. For example, a wedge-forming element can be used. Welding can be done by vibration or friction, such as, for example, piezoelectric welding. The method involves engaging the wedge between the surfaces of the bearing portions, and performing the welding upon contact of the wedge surfaces against the surfaces of the bearing portions.

In another embodiment, an irreversible contact connection is obtained by a spacing member formed by a deformable element made of metal, which is deformed in the space between the bearing portions up into the material plastic range. This provides the advantage of being able to compensate for a wide range of dimensional gaps in the rim, without it being necessary to apply too substantial deformation forces, contrary to the material plastic range in which the variation between the gaps and the forces is linear. Such an element can be U-shaped or V-shaped. It can be inserted until reaching the plastic deformation range once it is positioned between the bearing portions.

According to one embodiment of the invention, the sleeve bearing portions are connected to one another by at least one narrowing portion. The narrowing portion promotes the expansion of the sleeve by spacing the bearing portions apart. The narrowing portion moves apart within an elastic or plastic range limit. The narrowing portion can be comprised between about 0.5 and 2 millimeters (mm), or between about 0.9 and 1 mm.

According to another characteristic, the bearing portions are partially separated by at least one longitudinal slot extending up to the narrowing portion. The longitudinal slot is dimensioned, for example, between about 1 and 10 mm, or between about 1.2 and 8 mm. The slot thus enables the bearing portions to be spaced apart in the direction of the side walls of the rim. The slot can thus extend substantially parallel to the rim side walls. It can be located substantially in the median radial plane of the rim, or can be slightly offset with respect thereto. In particular, the slot can be offset when the cross section of the rim is asymmetrical.

The longitudinal slot can be open in the opposite direction relative to the transverse bridge of the rim. This embodiment has the advantage of exerting less forces on the rim outer portions that receive the tire, and greater forces for tightening the sleeve on the rim, at the junction between the side wall and the bottom of the rim. However, in another possible embodiment, the longitudinal slot is open toward the transverse bridge of the rim.

In one embodiment, the spacing member has the shape of at least one wedge. The term "wedge" means any wedging mechanism or element having contact surfaces forming a certain inclination angle therebetween and making it possible to obtain a certain spacing apart of two substantially opposite surfaces when the wedge or element is being forcibly engaged between these two surfaces, and to thus obtain an irreversible wedging without possibility of spontaneous retraction. Thus, the wedge can be inserted in a slot or passage formed between the bearing portions. In a first embodiment, the wedge has a substantially trapezoidal cross section or a tapered cross section, such as a conical cross section. The wedge angle of taper is generally determined as a function of the material coefficient of friction that determines the friction cone $+\phi$ and $-\phi$, so that the half-angle of the wedge is generally lower than the value $\phi$. Thus, for a wedge made of metal, such as aluminum alloy, for example, the two contact surfaces of the wedge form therebetween an angle of taper comprised, for example, between 2 and 14 degrees, so as to provide an irreversible wedging without any possible disengagement.

In another embodiment, the spacing member is formed of at least one spacing screw. Thus, the bearing portions of the sleeve are spaced apart by means of a screw that is engaged in these portions and pushes them back against the inner walls of the rim. In particular, the screw has a threaded shaft length that cooperates with a threaded bore length provided on each bearing portion of the sleeve.

In an alternative embodiment, the bearing portions and the narrowing portion of the sleeve form a unitary element. The sleeve can thus be made to have a substantially constant profile. It can be made of metal, such as aluminum alloy, or of titanium or titanium alloy, or yet of wood or a plastic material, such as an injected thermoplastic material. When made of metal, it can be manufactured by drawing or extruding at low cost and sectioned to the desired length. The sleeve can also be bent along the rim curvature in order to facilitate assembly in the rim.

According to a characteristic of an exemplary embodiment, each bearing portion includes a base portion that extends along the side wall of the rim and a tapered end portion that is inserted in the casing, at the intersection of the side wall and of the transverse bridge of the rim. In one particular embodiment, the tapered end portion and the base portion are coupled to one another by a narrowed portion forming a hinge. Thus, due to pressure from the spacing member, the tapered portion tends to bend in the area of the hinge, such that the sleeve becomes tensionally positioned in the rim by eliminating backlash. Such a configuration contributes to eliminating the backlash while reducing the forces that are necessary for tensioning the sleeve in the rim.

In a particular embodiment, the bearing portions form two sleeve portions that are separated and spaced apart. A spacing member is used in the space between the two bearing portions to space them apart and to provide an irreversible spacing connection.

The invention also relates to a cycle rim including a shaped element of revolution having the shape of a hollow box in radial cross section, with two end surfaces that are butt-joined along a junction, and affixed by means of a sleeve inserted in the hollow box of the shaped element, on both sides of the junction, the sleeve including sleeve bearing portions that exert an internal pressure inside and against the walls of the hollow box, such pressure being generated by the relative spacing apart of these portions by means of a spreading device, such as at least one spacing member, wherein the spacing member is a wedging member that provides spacing and irreversible wedging between the bearing portions.

The invention also relates to a cycle wheel including a rim according to the invention.

The invention also relates to a method for manufacturing the rim, including:
bending a metallic shaped element having a box-shaped cross section until a circular rim is formed;
mounting an expansible sleeve inside each free end of the rim;
expanding the sleeve by exerting an essentially lateral force thereon; and
bringing the ends of the shaped element closer until abutting the ends of the rim.

According to one embodiment of the invention, the lateral thrust force exerted by the sleeve is more substantial at the intersection between the rim bottom and the rim side wall than at the intersection between the upper bridge and the side wall of the rim. The advantage is essentially to concentrate the forces in a region of the rim having greater rigidity and to thus limit the rim deformation.

In particular, the sleeve is mounted by leaving a free slot portion in the sleeve, within which the wedge is inserted, between the two ends of the rim. For example, the wedge is pressed on its free surface inside the sleeve by means of a press, such as a hydraulically or mechanically assisted press. In view of the pressure exerted on the sleeve during this operation, the support can be sustained on the opposite surface of the sleeve during pressing. The portion of the wedge that is left projecting from the slot, after pressure insertion of the wedge in the sleeve, is removed, such as by cutting, milling, or grinding.

In a different embodiment of the method according to the invention, the lateral force on the sleeve is applied by means of a screw that laterally spaces the two sleeve bearing portions apart.

BRIEF DESCRIPTION OF DRAWINGS

Other characteristics and advantages of the invention will become apparent from the description that follows, with reference to the annexed drawings showing, by way of non-limiting examples, how the invention can be embodied, and in which:

FIG. 11 is a cross-sectional view along the line I-I of a third embodiment of the invention, before assembly.

FIG. 12 is a cross-sectional view along the line I-I of a third embodiment of the invention, after assembly.

DETAILED DESCRIPTION OF THE INVENTION

Figure 1:
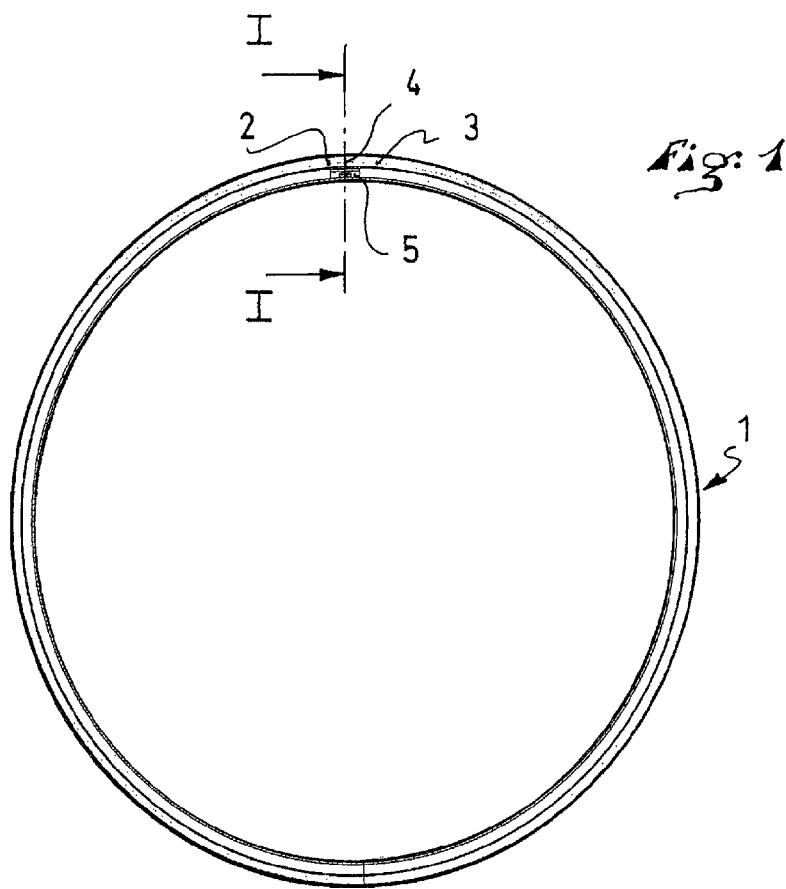
FIG. 1 is a plan view of an assembled rim according to the invention.

The rim 1 according to the invention, shown in FIG. 1, is in the form of a box-shaped profile of revolution about a transverse axis, having a circular shape with a large diameter. The rim is constructed from a bent segment having two ends 2, 3, the surfaces of which are butt-joined along a junction 4, or joining line. The coupling is done by means of a short sleeve 5 which, in principle, does not exceed the arc length separating two radially extending openings in the rim for two adjacent, i.e., successive, spokes. Therefore, along a length of the sleeve, the lower portion of the rim can be made to have no through hole. The sleeve is ideally distributed, at equal length, on both sides of the joining line 4 inside the box of the rim. The sleeve is in a tensioned state inside the rim so as to keep the two ends of the rim butt-joined.

For a wheel according to the invention, the rim 1 can be connected to a hub via spokes, if the wheel is for a bicycle, e.g., as disclosed in U.S. Pat. No. 6,641,227-B2 and in U.S. Patent Application Publication No. 2007/0046097-A1, the disclosures of both of which are herein incorporated by reference thereto in their entireties.

Figure 2:
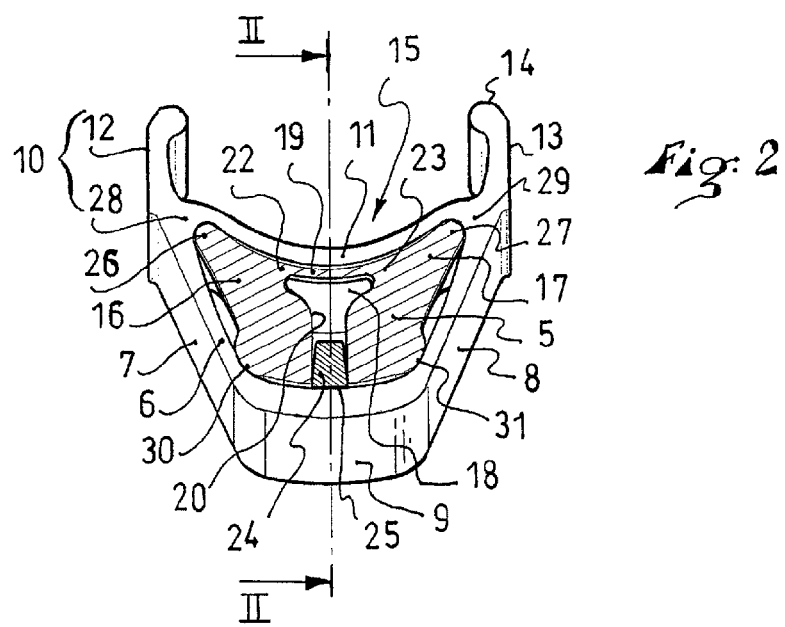
FIG. 2 is a partial cross-sectional view along the plane I-I of the rim of FIG. 1.

FIG. 2 shows the rim of FIG. 1 in the radial plane I-I, in the area of the junction line 4. The rim includes a hollow box 6, or casing, demarcated by a plurality of walls, i.e., two side walls 7, 8, or flanks, which are internally joined by a thicker bottom wall 9, on the inner side of the rim or hub, to form a U-shaped or V-shaped profile. At the upper base 10, the side walls 7, 8 are connected by an upper transverse bridge 11. The shape of the transverse bridge can be slightly concave. The upper base includes free walls 12, 13, or flanges, that end with widened edges 14, or lips, adapted to provide the inner retention of the tire. The widened edges thus form at least part of an annular channel 15 for receiving the tire. The term "upper," in the context used here, as in "upper wall" (or "upper bridge"), refers to that which is radially outward of the "bottom" wall (or "lower" wall), and the term "bottom," as in "bottom wall" (or "lower wall"), refers to that which is radially inward of the upper wall or bridge. In addition, rather than having a distinct lower wall or bridge, the side walls 7, 8 can taper toward and converge at the lower portion of the box shape.

A sleeve 5 according to the invention is thus arranged inside the hollow box shape 6. It includes bearing portions 16, 17 that are at least partially tensioned against the inner surfaces of the side walls 7, 8. The two portions 16, 17 are connected by a connecting portion 19 having a smaller cross section than the portions 16, 17. The connecting portion 19 extends transversely between the two lateral bearing portions 16, 17. Therefore, the connecting portion 19 forms a narrowed portion that demarcates, together with the two other portions 16, 17, a longitudinal opening or slot 20 that opens downward toward the bottom wall 9. Moreover, the slot is widened out in a T-shape, in a direction toward the connecting portion 19, having a widened cavity 18 extending transversely so as to create two hinges 22, 23 arranged between the connecting portion 19 and the bearing portions 16, 17. The slot 20 is partially occupied by a spreading device. In the illustrated embodiment, such device takes the form of a sleeve spacing member and, more particularly, takes the form of a wedge 24 inserted at the inlet of the slot, and which extends over at least a portion of the height of the slot.

The wedge-shaped spacing member 24 has a substantially trapezoidal shape, with converging lateral surfaces. The dimensions (especially the angle of inclination of the converging surfaces) and the shape of the wedge are selected so as to produce sufficient spacing forces on the inner surfaces of the bearing portions 16, 17. Thus, the base 25 of the wedge is substantially wider than the width of the slot 20 at its inlet. For example, the slot 20 has a substantially constant width. The bearing portions are thus pushed back substantially toward the inner surfaces of the side walls 7, 8, but also around the hinges 22, 23. Thus, the upper ridges 26, 27 of the sleeve are tensioned against the intersection zones 28, 29 of the side walls and of the bridge. The outer edges of the free ends of the bearing portions have bosses 30, 31 that apply localized forces near the intersection between the side walls 7, 8 and bottom wall 9. This force $F_1$ is essentially oriented laterally outward and causes a resulting reaction $F_0$ oriented inward of the sleeve and perpendicular with respect to the tangent to the contact line of the boss on the rim wall. This reaction is substantially inclined relative to the lateral direction of the rim, by an angle $\theta$ that is preferably less than 45 degrees, for example, on the order of 15 degrees. Tensional forces $F_2$ also occur on the upper ridges 26, 27, which promote the blocking of the sleeve and, therefore, the retention of the rim ends against one another.

Figure 3:
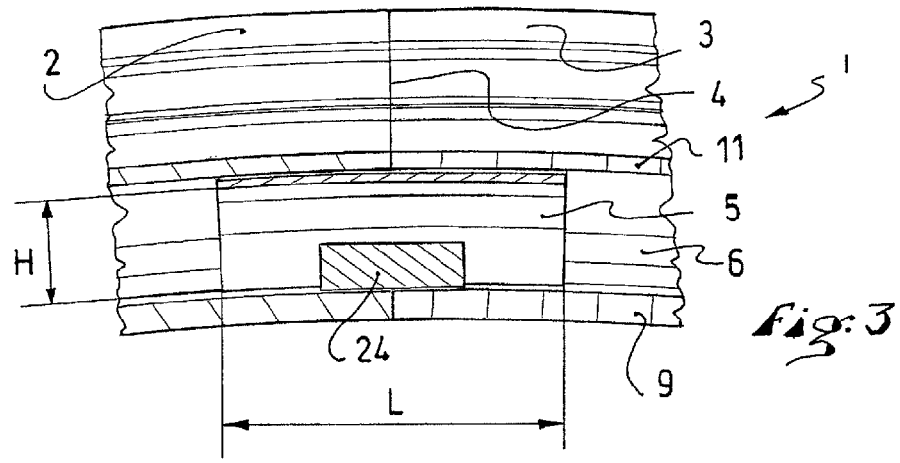
FIG. 3 is a longitudinal cross-sectional view along the plane II-II of the rim of FIG. 2.

FIG. 3 shows the rim 1 being assembled with the tensioned sleeve 5 that connects the two ends 2, 3 in the area of the junction 4. The slot extends, for example, along the entire length of the sleeve, so as to render the sleeve deformable over its entire length. The wedge-shaped spacing member can extend along at least a portion of the length of the sleeve. For example, the spacing member covers at least 10% of the length L of the slot, for example, at least 25% of the length L of the slot. The wedge-shaped member can have a rectangular longitudinal cross section or any other adapted shape. The spacing member 24 can be inserted along only a portion of the height H of the slot without, however, entering into contact with the bottom thereof, so as to avoid creating a hyperstatic system.

FIGS. 4 to 8 show the assembly principle for the rim according to the invention. The rim is made, as known, from a segment of a bent box-shaped element made of aluminum or aluminum alloy. In a preliminary extrusion or drawing phase, a bar having an initial profile is made by passing the metal through a die. The bar is bent into a plurality of coils, and then the rims are cut into the developed shape. In a subsequent step, the ends of each rim are butt-joined.

According to a first embodiment of the method according to the invention, after the bending operation, each end 2, 3 of each segment is connected by inserting a sleeve 5, such as described previously, into the hollow section.

Figure 4:
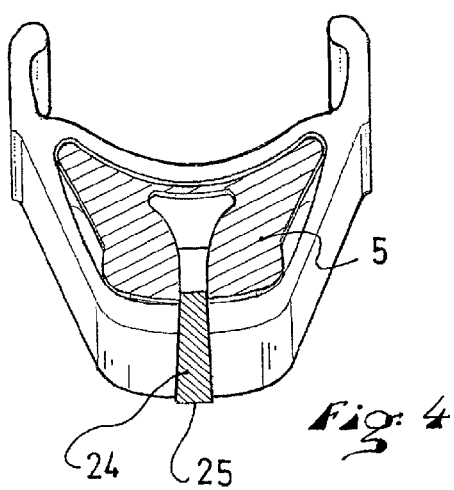
FIG. 4 is a cross-sectional view along the line I-I during assembly.
Figure 7:
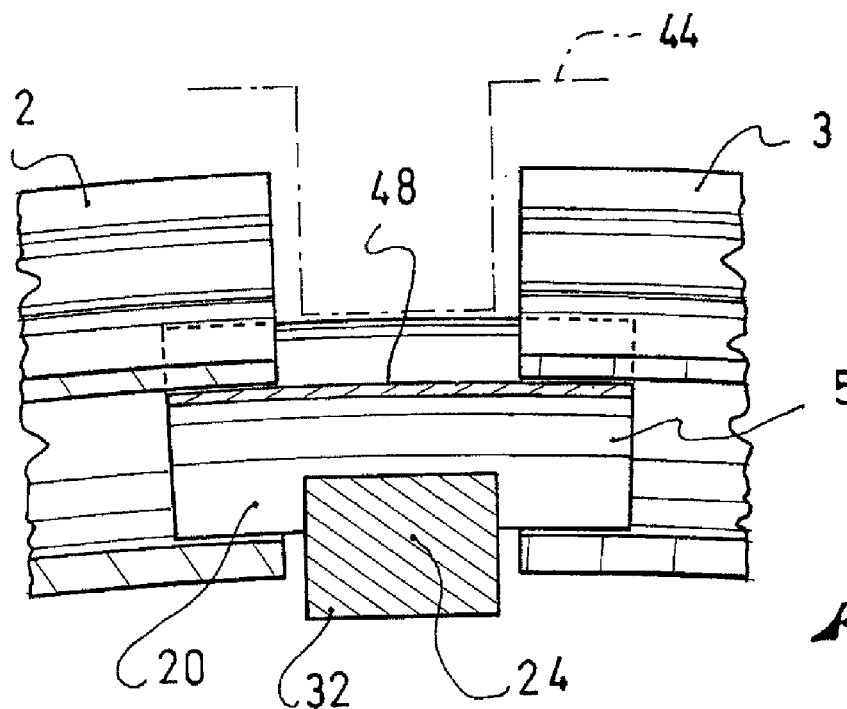
FIG. 7 is a cross-sectional view along the line II-II of the wedge being inserted in the sleeve.
Figure 8:
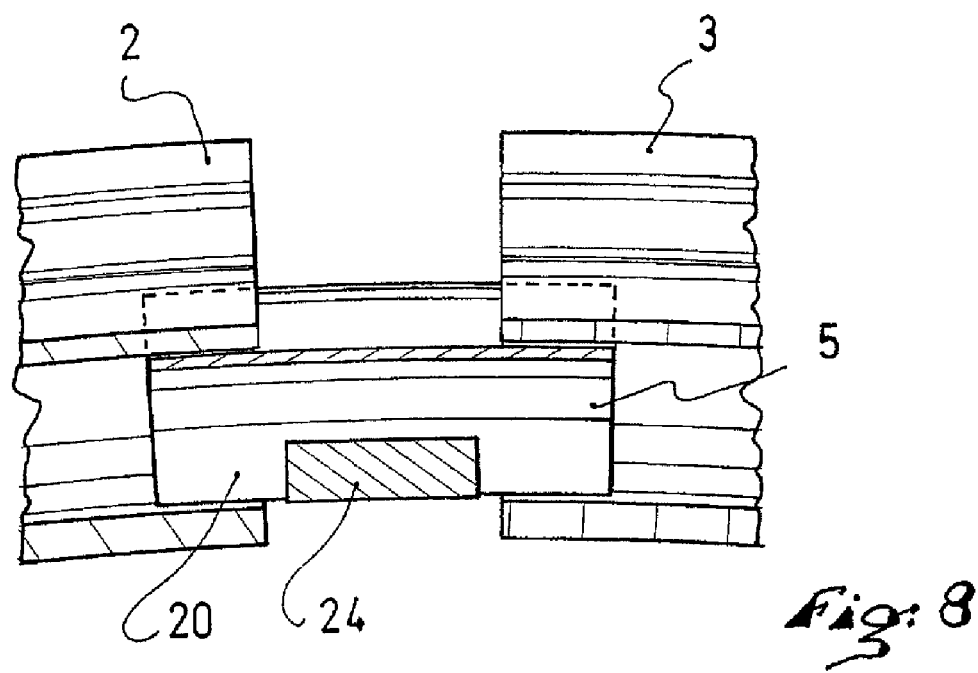
FIG. 8 is a cross-sectional view along the line II-II of the assembly operation, after the wedge being cut and prior to the ends of the rims being brought closer.

The sleeve 5 is assembled while the bearing portions are minimally spaced apart in order to enable the ends 2, 3 to come closer together while allowing the slot of the sleeve to be partially cleared. The slot being partially cleared enables the pre-positioning of the wedge-shaped spacing member 24, as shown in FIGS. 4 and 7. Once positioned, the spacing member is forcibly inserted so as to space the bearing portions 16, 17 apart. The forcible insertion can be carried out by means of a press. In order to prevent the sleeve from becoming deformed and to provide counter-pressure during pressing, a support element 44 is in contact with the upper surface 48 of the sleeve. The forced insertion of the spacing member is dependent upon the geometry and dimensions of the sleeve and of the rim, and of the backlash and tolerances to eliminate. The force exerted by the press can be considered to be in the order of 200 daN. Prior to bringing the ends of the rim closer to one another, the raised, non-insertable portion 32 of the wedge 24 is cut or milled. The rim is then in the state shown in FIG. 8. The last step involves bringing the ends 2, 3 of the rim closer by means of a press by enveloping the rim.

Figure 5:
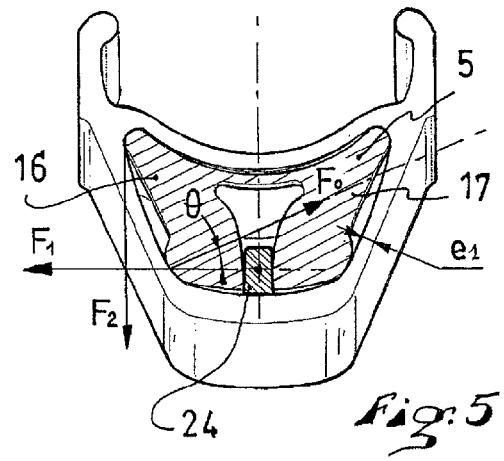
FIG. 5 is a cross-sectional view along the line I-I after assembly, on a rim with walls having maximal tolerances.

FIG. 5 shows a first rim including a thickness $e_1$ of the lateral walls corresponding to maximal tolerances; for example, a thickness in the order of 0.9 mm.

Figure 6:
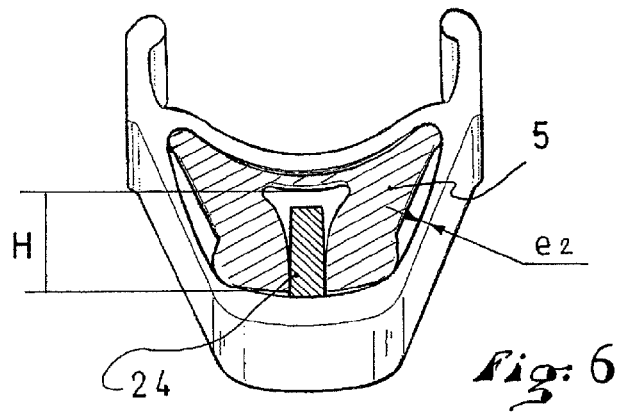
FIGS. 6 is a cross-sectional view along the line I-I after assembly, on a rim with walls having minimal tolerances.

FIG. 6 shows a second rim including a thickness $e_2$ of the lateral side walls corresponding to minimal tolerances; for example, a thickness in the order of 0.75 mm. Thus, the device according to the invention makes it possible to eliminate the maximum and minimum tolerances using the same elements. In the case of the rim with maximum tolerances, shown in FIG. 5, a lesser backlash elimination results in a lesser degree of insertion of the wedge into the slot of the sleeve. Conversely, for the rim with minimum tolerances, shown in FIG. 6, a greater backlash elimination results in a greater degree of insertion of the wedge into the slot of the sleeve.

Figure 9:
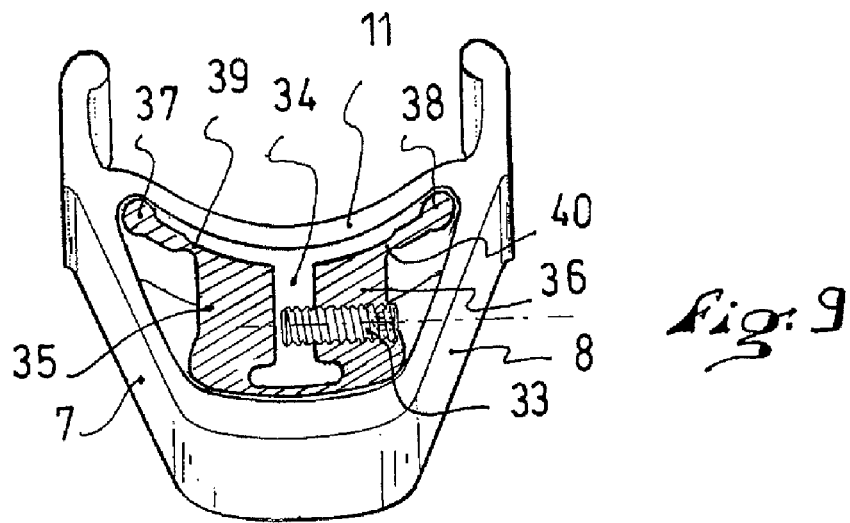
FIG. 9 is a cross-sectional view along the line I-I of a variation of the rim according to the invention, prior to the expansion of the sleeve.
Figure 10:
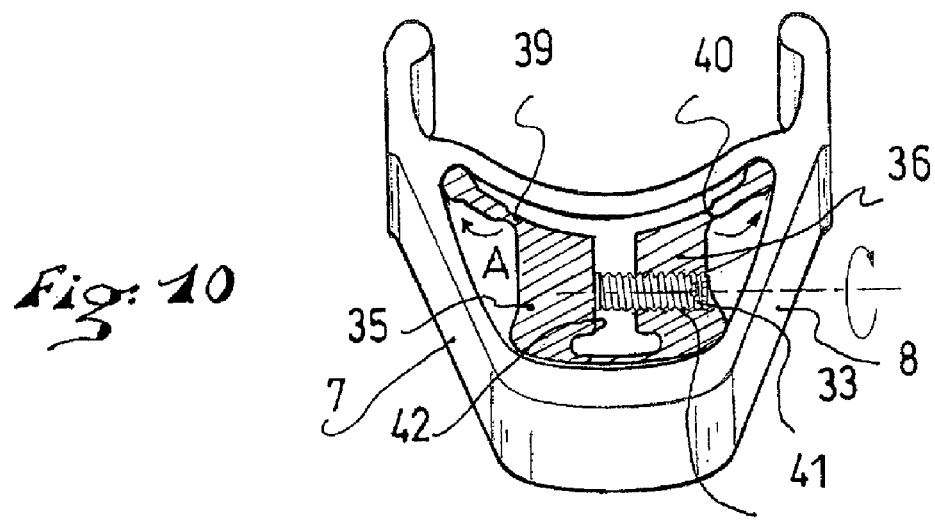
FIG. 10 is a cross-sectional view along the line I-I of a variation of the rim according to the invention, after the expansion of the sleeve.

FIGS. 9 and 10 show another embodiment of the invention, in which the spreading device, rather than being a wedge-shaped spacing member, takes the form of a spacing screw 33. The profile of the sleeve can be identical to the profile of the previously described embodiment, or can be different as shown. In the example shown, the sleeve includes a slot 34 formed between the bearing portions 35, 36 that opens toward the bridge 11. The bearing portions 35, 36 are also extended by tapered end portions 37, 38 toward the intersection between the bridge and the side walls 7, 8 of the rim. Moreover, narrowing portions 39, 40 forming hinges are arranged between the end portions 37, 38 and the bearing portions 35, 36.

The screw portion 33 thus engages in a threaded portion 41 of one of the portions 36 and takes support during tightening against the inner surface 42 of the opposite bearing portion 35, as shown in FIG. 9. As a result, the two bearing portions are spaced apart toward the side walls of the rim, and the end portions 37, 38 tilt along a direction A around the hinge portions 39, 40. A plurality of screws can serve as a spacing member on the sleeve, and can be distributed along the length and/or the height of the slot portion of the sleeve.

FIGS. 11 and 12 show another embodiment, in which the sleeve 5 is tensioned in the box of the rim by means of a spreading device whereby a wedge-shaped spacing member takes the form of a deformable element 43. The deformable element 43 includes at least a portion that is capable of undergoing deformation, such as by reaching the plastic elongation range, during insertion in the slot 20 between the two bearing portions 16, 17. For example, the element has an inverted U-shaped or V-shaped cross section, whose distance "d" between the ends of the arms is greater than the width l of the slot 20. In order to obtain sufficient tensional forces against the bearing portions and to compensate for the tolerances (on the order of 0.5 mm), an element can be used that is made of metal such as an aluminum alloy, for example, or a zinc alloy such as Zamac®, or steel that deforms by reaching the plastic elongation range of the material. The sleeve can also be made of a material such as aluminum or zinc alloy.

Figure 13:
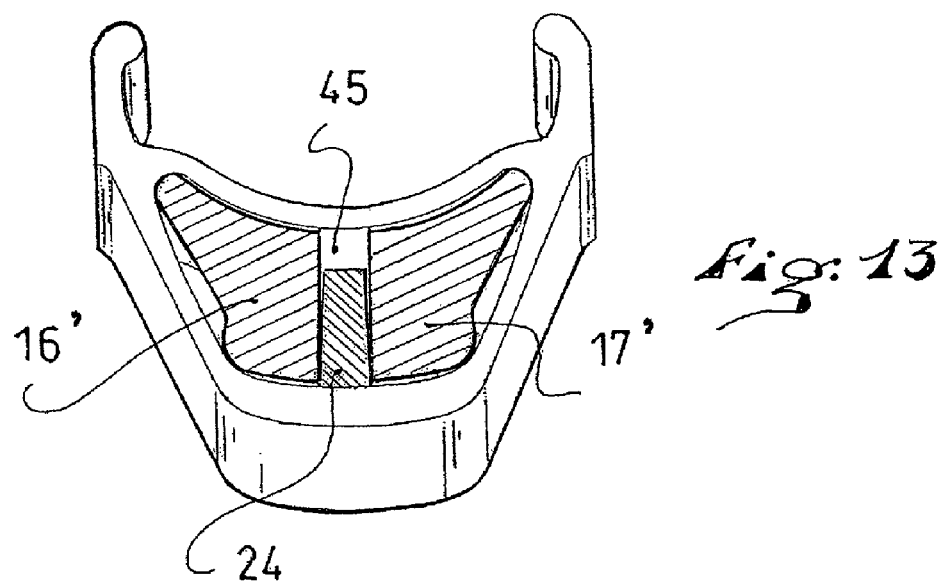
FIG. 13 is a cross-sectional view along the line I-I of a fourth embodiment of the invention, with a sleeve made of two separated bearing portions.

FIG. 13 shows an embodiment in which the sleeve is formed of two bearing portions 16', 17', which form two separated elements. The two portions are separated in a space 45 occupied at least partially by a spacing member such as a wedge 24, or a screw.

Figure 14:
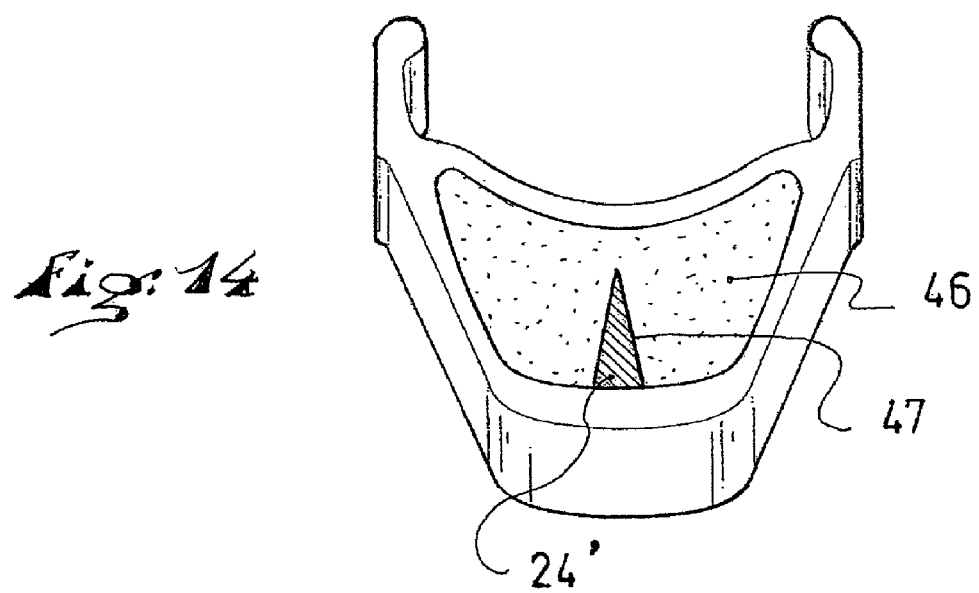
FIG. 14 is a cross-sectional view along the line I-I of a fifth embodiment of the invention, with a sleeve including bearing portions made of a material other than metal.

FIG. 14 shows an alternative embodiment in which the sleeve forms an expansible body 46 made of a material such as wood or plastic. A slit 47 is made in the body to enable a spacing member 24' to be inserted. The spacing member is a wedge. It can be made of any appropriate material, such as metal, plastic, or wood.

The invention is not limited to the several embodiments described and can cover a number of modifications. For example, the sleeve bearing portions can be two or more separated portions.

The invention claimed is:

1. A cycle rim comprising:
a hollow box comprising a radial cross-sectional shape extending along a circular path about a transverse axis;
said hollow box comprising a pair of lateral side walls and two end faces, said end faces approaching each other at a radial junction;
an arrangement to hold said end faces in position relative to said radial junction, said arrangement comprising:
a sleeve positioned within said hollow box, said sleeve having a length extending on opposite sides of said radial junction;
said sleeve further comprising two bearing portions, each of said bearing portions having a respective length extending along at least a portion of said length of said sleeve and extending on opposite sides of said radial junction;
a spreading device configured and arranged to apply forces within said hollow box and against said two bearing portions of said sleeve, said forces being directed substantially toward said pair of lateral side walls of said hollow box.

2. A cycle rim according to claim 1, wherein:
the spreading device is irreversibly lodged in at least one space between the two bearing portions of the sleeve.

3. A cycle rim according to claim 2, wherein:
the sleeve further comprises a connecting portion connecting together the two bearing portions of the sleeve.

4. A cycle rim according to claim 3, wherein:
the bearing portions are at least partially separated by at least one opening extending in a direction of the circular path of the hollow box;
the hollow box further comprises an upper bridge;
the opening extends in a direction toward, and is open at, the upper bridge of the hollow box of the rim.

5. A cycle rim according to claim 3, wherein:
the bearing portions are at least partially separated by at least one opening extending in a direction of the circular path of the hollow box;
the hollow box further comprises an upper bridge;
the opening extends, and is open, in a direction opposite to the upper bridge of the hollow box of the rim.

6. A cycle rim according to claims 3, wherein:
the two bearing portions and the connecting portion of the sleeve are parts of a single unitary piece.

7. A cycle rim according to claim 2, wherein:
the sleeve further comprises a narrow connecting portion connecting together the two bearing portions of the sleeve.

8. A cycle rim according to claim 7, wherein:
the bearing portions are at least partially separated by at least one opening elongated in a direction toward the circular path of the hollow box, said opening extending to the narrow connecting portion of the sleeve.

9. A cycle rim according to claim 2, wherein:
the bearing portions of the sleeve form two separate and entirely spaced-apart portions of the sleeve.

10. A cycle rim according to claim 2, wherein:
the bearing portions of the sleeve are at least partially separated by at least one opening extending in a direction of the circular path of the hollow box;
the spreading device comprises at least one spacer positioned within said opening between the bearing portions of the sleeve.

11. A cycle rim according to claim 10, wherein:
the spacer has a tapered section.

12. A cycle rim according to claim 10, wherein:
the spacer has a section substantially trapezoidal in shape.

13. A cycle rim according to claim 11, wherein:
the spacer has a pair of engagement surfaces forming an angle of between 2 and 14 degrees.

14. A cycle rim according to claim 2, wherein:
the spreading device comprises at least one screw-activated spreading device.

15. A cycle rim according to claim 1, wherein:
the hollow box further comprises an upper bridge extending between the pair of lateral side walls;
each of the bearing portions of the sleeve comprises:
an interior portion extending along a respective one of the lateral side walls of the hollow box; and
a tapered tip portion fitted at an intersection between the upper bridge and a respective one of the lateral side walls of the hollow box.

16. A cycle rim according to claim 15, wherein:
a narrow hinge portion extends from each of the tapered tip portions to a respective one of the bearing portions of the sleeve.

17. A wheel comprising a cycle rim according to claim 1.

18. A cycle rim according to claim 1, wherein:
the sleeve is made of metal.

19. A cycle rim according to claim 1, wherein:
the sleeve is made of a material comprising a member selected from the group consisting of aluminum, aluminum alloy, titanium, and titanium alloy.

20. A cycle rim according to claim 1, wherein:
the sleeve is made of plastic.

21. A cycle rim according to claim 1, wherein:
the sleeve is made of a thermoplastic material.

22. A cycle rim according to claim 1, wherein:
the hollow box of the rim includes a bottom wall;

the bottom wall is thicker than each of the lateral side walls.

23. A cycle rim according to claim 1, wherein:
the spreading device has a length less than the length of the sleeve.

24. A cycle rim according to claim 1, wherein:
between the two end faces, the hollow box has a constant cross-sectional profile.

25. A cycle rim according to claim 1, wherein:
the sleeve extends transversely from a first of the lateral side walls to a second of the lateral side walls.

26. A cycle rim according to claim 1, wherein:
the hollow box further comprises a lower portion between the lateral side walls;
along a length of the sleeve, the lower portion has no through hole.

27. A cycle rim according to claim 1, wherein:
the lateral side walls are outer lateral side walls;
the spreading device is configured and arranged to apply forces within said hollow box and against said two bearing portions of said sleeve, said forces being directed substantially to said pair of outer lateral side walls of said hollow box.

28. A cycle rim according to claim 1, wherein:
the spreading device is configured and arranged to apply forces within said hollow box and against said two bearing portions of said sleeve to space apart said two bearing portions of said sleeve toward said pair of lateral side walls of said hollow box.

29. A cycle rim comprising:
a hollow box comprising a radial cross-sectional shape extending along a circular path about a transverse axis;
said hollow box comprising a pair of outer lateral side walls and two end faces, said end faces approaching each other at a radial junction;
an arrangement to hold said end faces in position relative to said radial junction, said arrangement comprising:
 a sleeve positioned within said hollow box, said sleeve extending on opposite sides of said radial junction along said circular path;
 said sleeve further comprising two bearing portions, each of said bearing portions having a respective length extending on opposite sides of said radial junction along said circular path, said sleeve extending transversely from a first of the pair of outer lateral side walls to a second of the pair of outer lateral side walls;
 a spreading device configured and arranged to have been irreversibly wedged between the two bearing portions.

30. A wheel comprising a cycle rim according to claim 29.

31. A cycle rim according to claim 29, wherein:
the hollow box further comprises a lower portion between the lateral side walls;
along a length of the sleeve, the lower portion has no through hole.

32. A cycle rim according to claim 29, wherein:
the spreading device is configured and arranged to apply forces within said hollow box and against said two bearing portions of said sleeve to space apart said two bearing portions of said sleeve toward said pair of lateral side walls of said hollow box.

33. A method of manufacturing a rim, said method comprising:
bending a section of an elongated hollow box-shaped metallic element into a rim extending circularly about a transverse axis, the box-shaped metallic element having a pair of ends adapted to be joined;
mounting an expandable sleeve to extend within both of the pair of ends;
expanding the sleeve by applying a substantially transversely directed force on the sleeve;
positioning the pair of ends closer together to a predeterminate position relative to a radial junction.

34. A method according to claim 33, wherein:
the hollow box-shaped metallic element of the rim includes a pair of lateral side walls, an upper bridge extending between the lateral side walls, and a lower portion;
said applying a substantially transversely directed force on the sleeve comprises applying a greater component of force at an intersection between the lower portion and the lateral side walls of the box-shaped metallic element than at an intersection between the upper bridge and the lateral side walls of the box-shaped metallic element.

35. A method according to claim 33, wherein:
said applying a substantially transversely directed force on the sleeve comprises inserting a spacer into an opening of the sleeve.

36. A method according to claim 35, wherein:
said inserting a spacer comprises inserting the spacer by means of a press.

37. A method according to claim 35, wherein:
said applying a substantially transversely directed force on the sleeve comprises inserting a deformable spacer into an opening of the sleeve.

38. A method according to claim 37, wherein:
said inserting a deformable spacer into an opening of the sleeve comprises inserting a plastic spacer into the opening and causing plastic elongation of the spacer.

39. A method according to claim 36, wherein:
after said inserting a spacer, a portion of the spacer projects from the sleeve;
the method further comprises removing the portion of the spacer that projects from the sleeve.

40. A method according to claim 33, wherein:
the sleeve has a radially inward free slot portion positioned between the pair of ends of the box-shaped element;
said applying a substantially transversely directed force on the sleeve comprises inserting a spacer into the radially inward free slot portion of the sleeve.

41. A method according to claim 33, wherein:
said expanding the sleeve comprises applying a substantially transversely directed force on the sleeve by means of at least one screw.

42. A method according to claim 33, wherein:
the hollow box further comprises a lower portion between the lateral side walls;
along a length of the sleeve, no through hole is made in the lower portion.

\* \* \* \* \*